United States Patent
Son et al.

(10) Patent No.: US 11,269,378 B2
(45) Date of Patent: Mar. 8, 2022

(54) SHAPE RETAINING STRUCTURE OF ELECTRONIC DEVICE AND ELECTRONIC DEVICE INCLUDING SAME

(71) Applicant: Samsung Electronics Co., Ltd., Gyeonggi-do (KR)

(72) Inventors: Jongdeuk Son, Gyeonggi-do (KR); Yeran Ji, Seoul (KR); Jungsuk Chae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 67 days.

(21) Appl. No.: 16/639,310

(22) PCT Filed: Aug. 24, 2018

(86) PCT No.: PCT/KR2018/009789
§ 371 (c)(1),
(2) Date: Feb. 14, 2020

(87) PCT Pub. No.: WO2019/045370
PCT Pub. Date: Mar. 7, 2019

(65) Prior Publication Data
US 2021/0034111 A1  Feb. 4, 2021

(30) Foreign Application Priority Data
Sep. 1, 2017  (KR) .................. 10-2017-0111698

(51) Int. Cl.
*H04B 1/08* (2006.01)
*G06F 1/16* (2006.01)
(Continued)

(52) U.S. Cl.
CPC ............ *G06F 1/1652* (2013.01); *G06F 1/163* (2013.01); *G09F 9/301* (2013.01); *H04M 1/0202* (2013.01); *H04M 1/0268* (2013.01)

(58) Field of Classification Search
CPC . H04M 1/0202; H04M 1/0268; G06F 1/1652; G06F 1/163; G09F 9/301
(Continued)

(56) References Cited

U.S. PATENT DOCUMENTS

| 7,492,891 B2 * | 2/2009 | Eldon | ................... G06F 1/1616 |
| | | | 379/433.12 |
| 8,493,730 B2 * | 7/2013 | Shim | ..................... G06F 1/1681 |
| | | | 361/679.55 |

(Continued)

FOREIGN PATENT DOCUMENTS

| CN | 205755111 U | 11/2016 |
| EP | 2 403 222 A1 | 1/2012 |

(Continued)

OTHER PUBLICATIONS

European Search Report dated Jul. 16, 2020.
European Search Report dated Jan. 12, 2021.

*Primary Examiner* — Hai V Nguyen
(74) *Attorney, Agent, or Firm* — Cha & Reiter, LLC (57) ABSTRACT

Provided is an electronic device comprising: a first unmodified section, which is one part of an electronic device having a modifiable shape and has a fixed and retained shape; a modification section extending from the first unmodified section and capable of being bent in one direction; a second unmodified section extending from the modification section and formed to be smaller than the first unmodified section; a flexible display arranged on one surface across the first unmodified section, the modification sensation and the second unmodified section; an elastic plate arranged on the other surface across the first unmodified section, the modification section and the second unmodified section; and a shape fixing unit provided in the first unmodified section or
(Continued)

the second unmodified section so as to retain the modified shape of the electronic device. Additionally, other embodiments are possible.

10 Claims, 14 Drawing Sheets

(51) Int. Cl.
  *G09F 9/30* (2006.01)
  *H04M 1/02* (2006.01)
(58) Field of Classification Search
  USPC .................................. 455/575.4, 90.3, 347
  See application file for complete search history.

(56) References Cited

U.S. PATENT DOCUMENTS

| | | | | |
|---|---|---|---|---|
| 8,787,016 | B2* | 7/2014 | Rothkopf | G06F 1/1681 |
| | | | | 361/679.55 |
| 8,855,726 | B2* | 10/2014 | Ozawa | G06F 1/1618 |
| | | | | 455/575.1 |
| 9,158,334 | B2* | 10/2015 | Vanska | G06F 1/1626 |
| 9,529,200 | B2* | 12/2016 | Thurber | G02B 27/0172 |
| 9,786,207 | B2* | 10/2017 | Kim | G06F 1/1626 |
| 9,941,918 | B2* | 4/2018 | Kim | G06F 1/1652 |
| 10,032,391 | B2* | 7/2018 | Kim | G09F 9/301 |
| 10,185,364 | B2* | 1/2019 | Seo | A44C 5/105 |
| 10,317,941 | B2* | 6/2019 | Janowski | A45F 3/14 |
| 10,380,956 | B2* | 8/2019 | Okamoto | H01L 27/3276 |
| 10,380,976 | B2* | 8/2019 | Chen | G06F 3/1446 |
| 10,402,033 | B2* | 9/2019 | Hong | G06F 3/0446 |
| 10,485,100 | B2* | 11/2019 | Senda | G06F 1/1652 |
| 10,770,010 | B2* | 9/2020 | Okamoto | G09G 3/3607 |
| 10,817,241 | B2* | 10/2020 | Chen | G06F 3/0482 |
| 10,827,631 | B2* | 11/2020 | Liu | G09F 9/301 |
| 10,834,814 | B2* | 11/2020 | Cho | H04M 1/0247 |
| D904,331 | S* | 12/2020 | Lee | D14/138 AB |
| 10,877,522 | B2* | 12/2020 | Jia | H04M 1/022 |
| 10,948,947 | B2* | 3/2021 | Yoon | G06F 1/1641 |
| 10,951,253 | B2* | 3/2021 | Kim | H04B 1/3827 |
| 11,026,336 | B1* | 6/2021 | He | H05K 5/0226 |
| 2009/0257807 | A1* | 10/2009 | Woloschyn | G06F 3/0221 |
| | | | | 400/489 |
| 2010/0248796 | A1* | 9/2010 | Higashigawa | H04M 1/0237 |
| | | | | 455/575.4 |
| 2011/0134087 | A1 | 6/2011 | Moriwaki | |
| 2012/0002360 | A1 | 1/2012 | Seo et al. | |
| 2014/0111549 | A1* | 4/2014 | Vanska | G06F 1/1656 |
| | | | | 345/656 |
| 2015/0062927 | A1 | 3/2015 | Hirakata et al. | |
| 2015/0373863 | A1 | 12/2015 | Lin et al. | |
| 2015/0378391 | A1* | 12/2015 | Huitema | G09F 21/02 |
| | | | | 361/679.03 |
| 2016/0011424 | A1* | 1/2016 | Thurber | G02B 27/0172 |
| | | | | 345/8 |
| 2016/0014919 | A1* | 1/2016 | Huitema | G04G 17/08 |
| | | | | 313/511 |
| 2016/0037625 | A1* | 2/2016 | Huitema | G09F 21/026 |
| | | | | 361/749 |
| 2016/0041585 | A1 | 2/2016 | Cheng | |
| 2016/0062408 | A1 | 3/2016 | Lee et al. | |
| 2016/0081180 | A1* | 3/2016 | Huitema | H01L 51/0097 |
| | | | | 361/749 |
| 2016/0081204 | A1 | 3/2016 | Park et al. | |
| 2016/0195938 | A1* | 7/2016 | Kim | H04B 1/3827 |
| | | | | 345/156 |
| 2016/0198100 | A1* | 7/2016 | Cho | G06F 3/0487 |
| | | | | 348/222.1 |
| 2016/0324023 | A1 | 11/2016 | Kim et al. | |
| 2016/0357222 | A1* | 12/2016 | Seo | G06F 1/1652 |
| 2016/0381014 | A1 | 12/2016 | Kim | |
| 2017/0092224 | A1* | 3/2017 | Senda | H05K 1/0268 |
| 2017/0235341 | A1* | 8/2017 | Huitema | G04G 17/08 |
| | | | | 361/679.03 |
| 2017/0262016 | A1* | 9/2017 | Janowski | A45F 3/14 |
| 2017/0365197 | A1* | 12/2017 | Kim | G09F 9/301 |
| 2018/0191391 | A1* | 7/2018 | Kim | G06F 1/1626 |

FOREIGN PATENT DOCUMENTS

| | | |
|---|---|---|
| JP | 2015-72465 A | 4/2015 |
| KR | 10-2016-0085190 A | 7/2016 |
| KR | 10-2017-0026023 A | 3/2017 |

* cited by examiner

SHAPE RETAINING STRUCTURE OF ELECTRONIC DEVICE AND ELECTRONIC DEVICE INCLUDING SAME

CLAIM OF PRIORITY

This application is a National Phase Entry of PCT International Application No. PCT/KR2018/009789, which was filed on Aug. 24, 2018 and claims a priority to Korean Patent Application No. 10-2017-0111698, which was filed on Sep. 1, 2017, the contents of which are incorporated herein by reference.

TECHNICAL FIELD

The disclosure relates to an electronic device having a modifiable shape through a flexible display.

BACKGROUND ART

In these days, mobile communication terminals are becoming smaller, thinner, and lighter with the development of their hardware performance, and are also reaching a so-called mobile convergence stage of including various functions of other devices.

Further, as new display technologies are introduced and related materials are improved, some of the mobile communication terminals come to have a shape-modifiable structure. According to this trend, a variety of wearable devices that can be worn on a human body have been actively developed.

DISCLOSURE OF INVENTION

Technical Problem

Embodiments of the disclosure are to provide a shape-modifiable electronic device capable of retaining a state of being worn on a human body to prevent or reduce a damage or loss, and also provide a shape-retaining structure for the electronic device.

Solution to Problem

According to embodiments of the disclosure, a shape-modifiable electronic device may include a first non-modifiable section which is one portion of an electronic device housing and has a fixed and retained shape; a modifiable section which is another portion of the electronic device housing, extends from the first non-modifiable section, and is capable of being bent and deformed in one direction; a second non-modifiable section which is still another portion of the electronic device housing, extends from the modifiable section, and is formed to be smaller than the first non-modifiable section; a flexible display disposed on one surface throughout the first non-modifiable section, the modifiable sensation, and the second non-modifiable section; an elastic plate disposed on other surface throughout the first non-modifiable section, the modifiable sensation, and the second non-modifiable section; and a shape-fixing part provided in the first non-modifiable section or the second non-modifiable section so as to retain a modified shape of the electronic device.

According to embodiments of the disclosure, a shape retaining structure of a shape-modifiable electronic device includes a first non-modifiable section, a modifiable section, a second non-modifiable section, and a flexible display, and may include an elastic plate disposed on a surface opposite to a surface where the flexible display is disposed, throughout the first non-modifiable section, the modifiable sensation, and the second non-modifiable section; and a shape-fixing part provided in the first non-modifiable section or the second non-modifiable section so as to retain a modified shape of the electronic device.

Advantageous Effects of Invention

A shape-modifiable electronic device can be deformed uniformly and smoothly, and a deformed shape of the shape-modifiable electronic device can be retained stably.

MODE FOR THE INVENTION

Hereinafter, various embodiments of the disclosure are described in detail with reference to accompanying drawings. The embodiments and terms used herein are not intended to limit the technology disclosed in specific forms and should be understood to include various modifications, equivalents, and/or alternatives to corresponding embodiments. In the drawings, similar reference numbers are used to indicate similar constituent elements. As used herein, singular forms are intended to include the plural forms as well, unless the context clearly indicates otherwise. In the disclosure, the expression "A or B" or "at least one of A and/or B" is intended to include any possible combination of enumerated items. In the present disclosure, expressions such as "1st" or "first", "2nd" or "second", etc. may modify various components regardless of the order and/or the importance but do not limit corresponding components. When it is mentioned that a certain (first) component is "(functionally or communicatively) connected" to or "accessed" by another (second) component, it may be understood that the component is directly connected to or accessed by the other component or that still other (third) component is interposed between the two components.

In the disclosure, the expression "configured to (or set to) ~" may be interchangeably used with other expressions "suitable for ~", "having the capacity to ~", "designed to ~", "adapted to ~", "made to ~", or "capable of ~". In some situations, the expression "a device configured to ~" may mean that the device is "capable of ~" with other devices or components.

FIGS. 1A to 1F are six views showing a shape-modifiable electronic device 100 according to an embodiment of the disclosure.

Figure 1A:
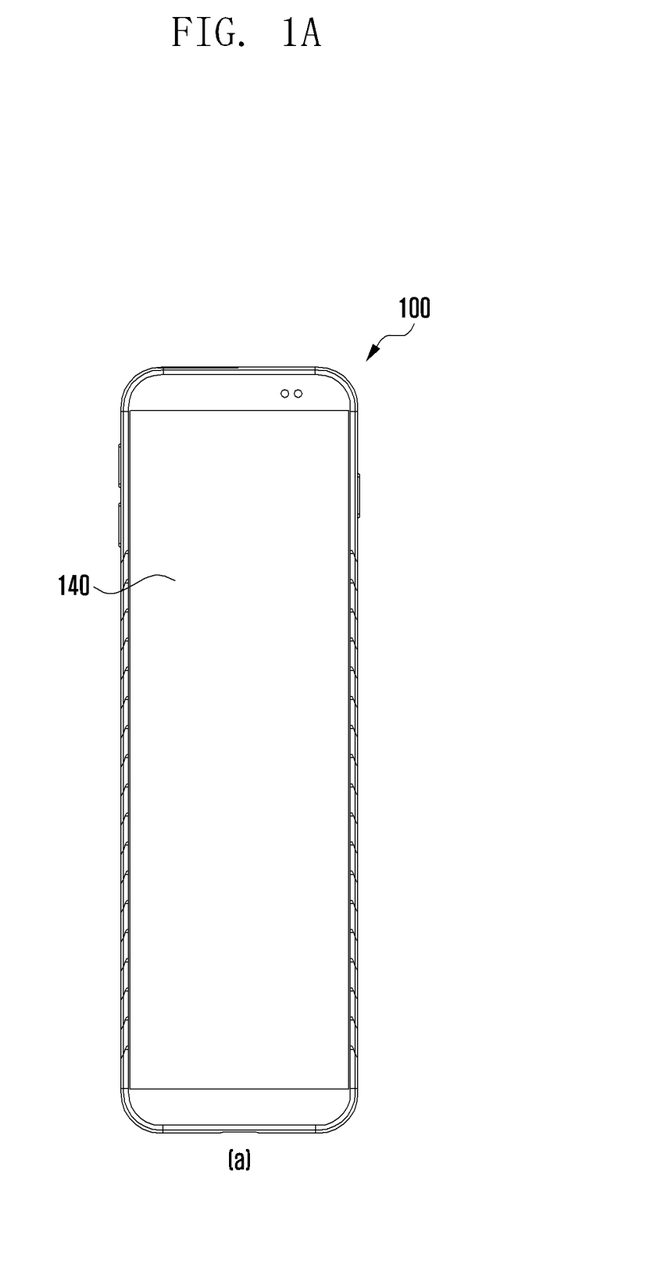
FIGS. 1A to 1F are six views showing a shape-modifiable electronic device according to an embodiment of the disclosure.
Figure 1B:
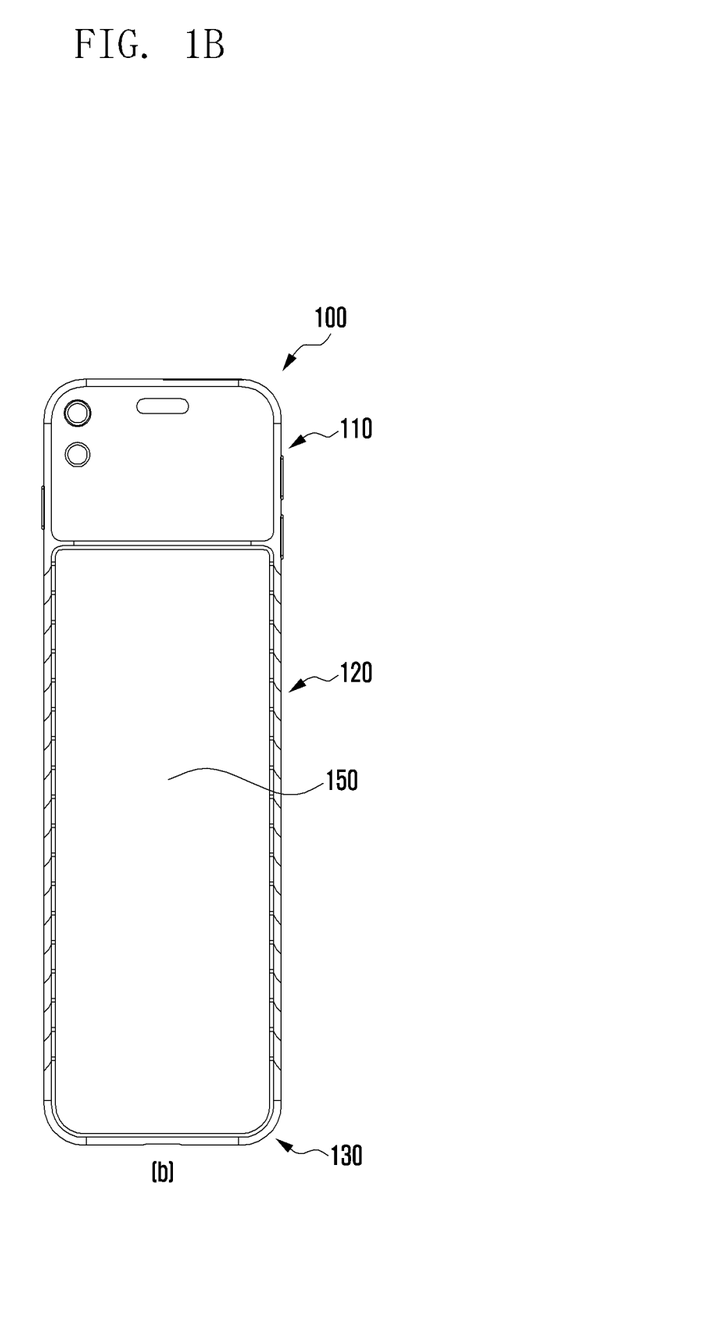

FIG. 1A is a front view of the shape-modifiable electronic device 100 according to an embodiment of the disclosure in which a flexible display 140 is disposed. FIG. 1B is a rear view of the shape-modifiable electronic device 100 according to an embodiment of the disclosure in which an elastic plate 150 is disposed.

Figure 1C:
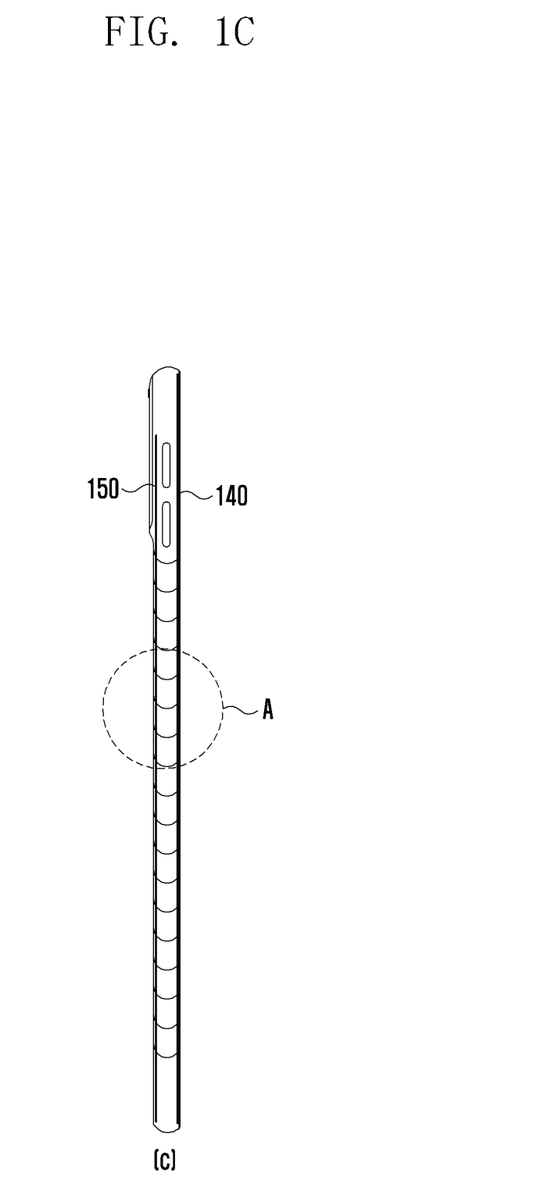
Figure 1D:
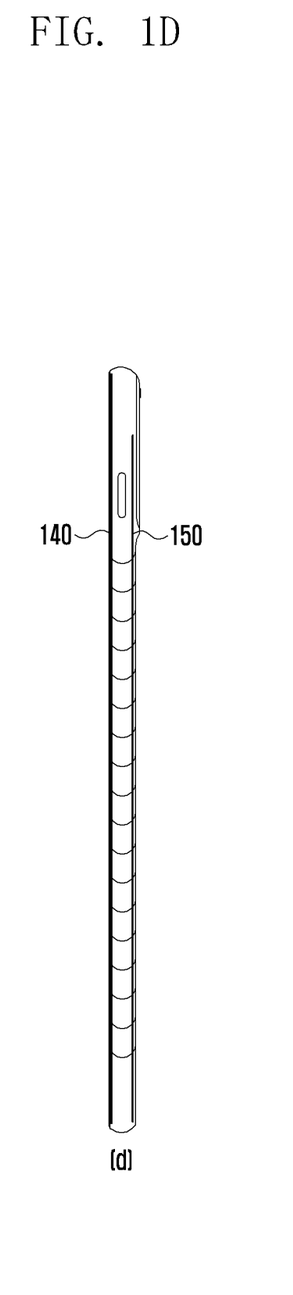
Figure 1E:
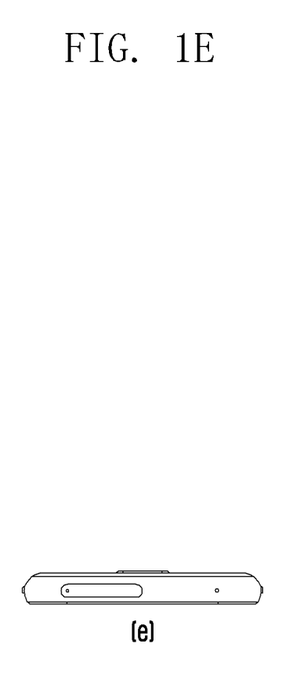
Figure 1F:
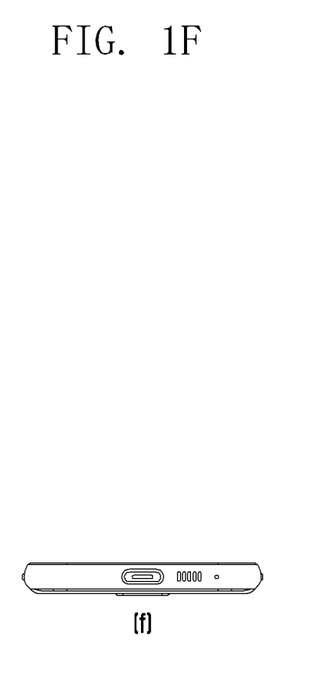

FIGS. 1C to 1D are left and right side views of the shape-modifiable electronic device 100 according to an embodiment of the disclosure. In FIGS. 1C to 1D, a portion indicated by a wave pattern corresponds to a modifiable section 120. When an external force is applied, the modifiable section 120 may be bent and deformed in one direction.

Above the modifiable section 120 is a first non-modifiable section 110. The first non-modifiable section 110 refers to a portion where its shape is not deformed but maintained. In the first non-modifiable section 110, components such as a PCB, a camera module, a flash module, an external memory slot, and a USIM card slot may be disposed.

Below the modifiable section 120 is a second non-modifiable section 130. The second non-modifiable section 130 as well refers to a portion where its shape is not deformed but maintained. In the second non-modifiable section 130, components such as a USB connection terminal, a speaker, and an antenna may be disposed.

The above-mentioned components that may be disposed in the first and second non-modifiable sections 110 and 130 are exemplary only. Alternatively, such components may be interchangeably disposed, and any other component may be further disposed.

The flexible display 140 may be disposed on one surface of the electronic device throughout the first non-modifiable section 110, the modifiable section 120, and the second non-modifiable section 130. In addition, the flexible display 140 may be formed to correspond to the total length of the first non-modifiable section 110, the modifiable section 120, and the second non-modifiable section 130 when the modifiable section 120 is in a straight state.

The flexible display 140 may be formed such that when the modifiable section 120 is bent and thereby deformed, one end is fixed to the first non-modifiable section 110 and the other end slides. At this time, the inside of the second non-modifiable section 130 adjacent to the other end may be exposed.

The elastic plate 150 may be disposed on another surface of the electronic device throughout the first non-modifiable section 110, the modifiable section 120, and the second non-modifiable section 130. That is, the elastic plate 150 may be disposed on a surface opposite to the surface where the flexible display 140 is disposed. In addition, the elastic plate 150 may be formed to correspond to the total length of the first non-modifiable section 110, the modifiable section 120, and the second non-modifiable section 130 when the modifiable section 120 is bent and thereby deformed.

The elastic plate 150 may be formed such that when the modifiable section 120 is bent and thereby deformed, one end is fixed to the second non-modifiable section 130 and the other end slides. The sliding end of the elastic plate 150 may be provided in the first non-modifiable section 110. The elastic plate 150 may be formed inside the electronic device so as not to be exposed, or may be formed as a part of a housing of the electronic device and exposed to the outside. The elastic plate 150 may be made of a variety of materials, e.g., a stainless steel material, which can provide an elastic restoring force after deformation.

Figure 2A:
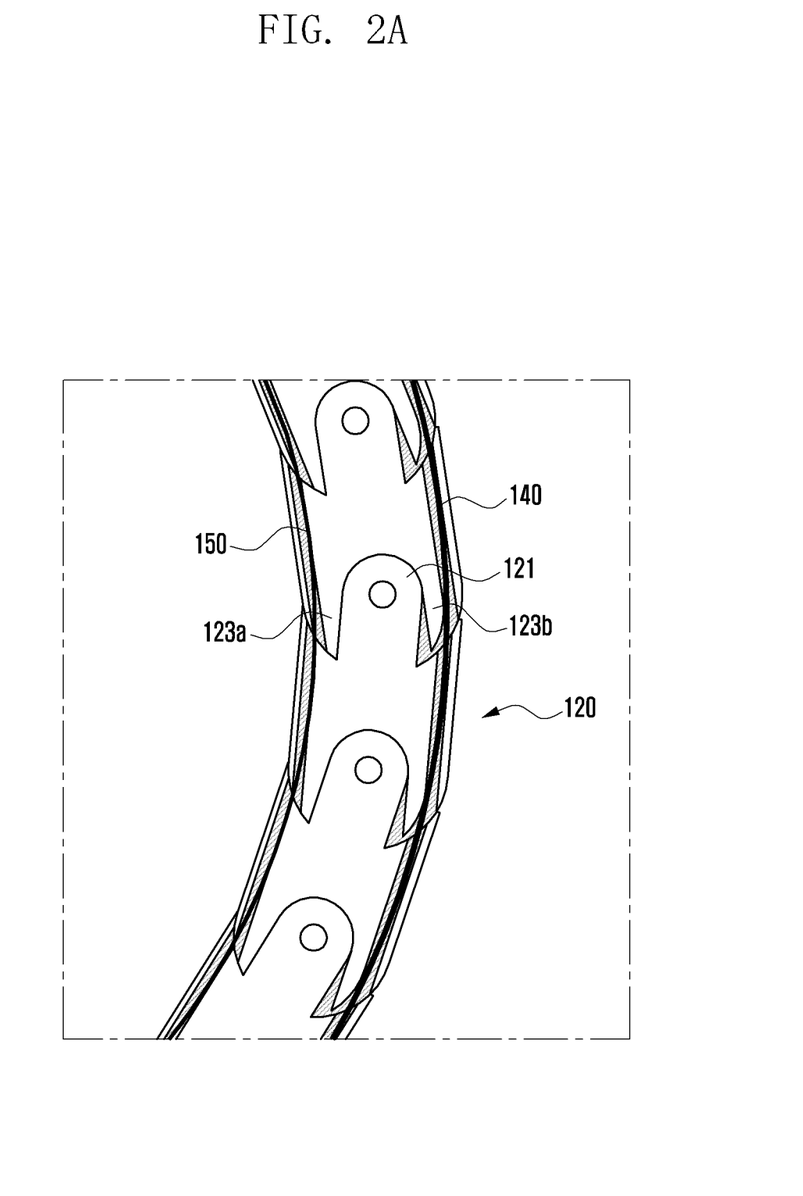
FIGS. 2A and 2B are enlarged views, focused on a portion A of FIG. 1C, showing states after and before a bending deformation of a shape-modifiable electronic device according to an embodiment of the disclosure.
Figure 2B:
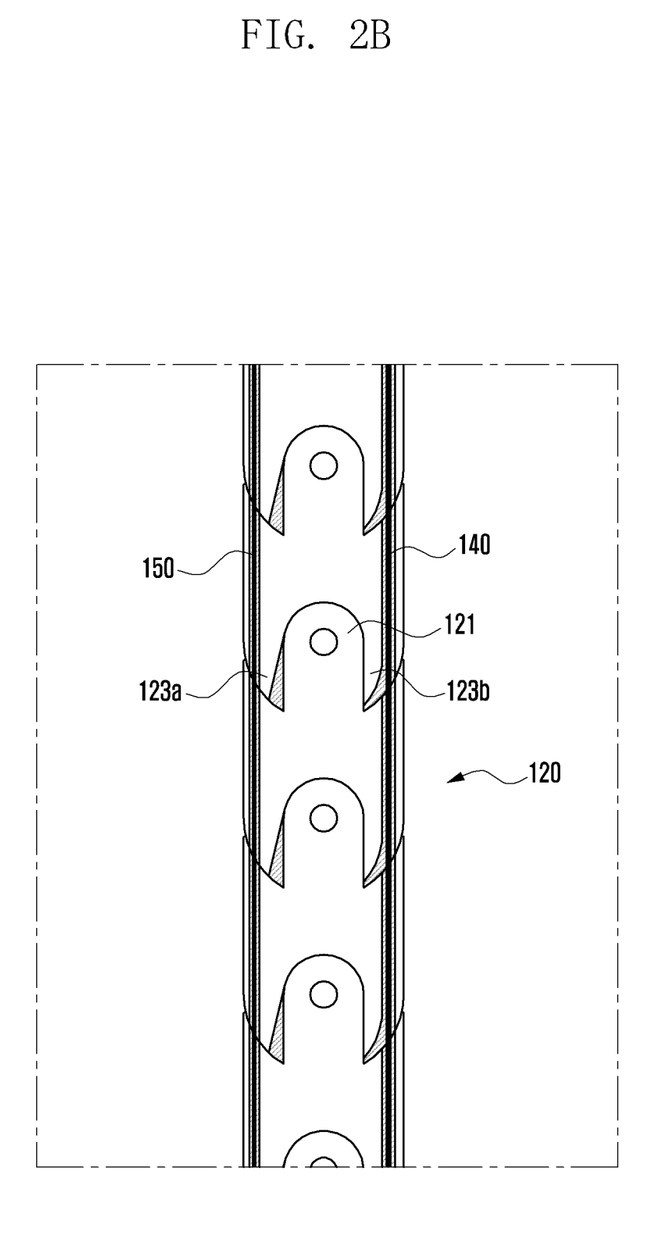

FIGS. 2A and 2B are enlarged views showing states after and before a bending deformation of a shape-modifiable electronic device 100 (see FIG. 1A) according to an embodiment of the disclosure. Specifically, FIG. 2A shows a state where the modifiable section 120 is bent and thereby deformed, and FIG. 2B shows a state where the modifiable section 120 is unfolded straightly.

The modifiable section 120 of the shape-modifiable electronic device 100 (see FIG. 1A) according to an embodiment of the disclosure may be composed of circular hinges. Using the circular hinges enables smooth and uniform bending deformation throughout the modifiable section 120. In addition, as the modifiable section 120 is deformed uniformly and smoothly, the flexible display 140 or the elastic plate 150 may also be deformed uniformly and smoothly so that stress is not concentrated at a specific point.

Referring to FIG. 2B, in the modifiable section 120, one circular hinge is engaged with another circular hinge, and each circular hinge is composed of a hinge portion 121 providing the center of rotation of the hinge and a pair of protruding portions 123 engaged with the hinge portion 121 of another hinge. The hinge portion 121 has a narrower width than the left and right protruding portions 123, and the hinges may be assembled such that the hinge portion 121 of one hinge is inserted into the left and right protruding portions 123 of another hinge. Therefore, when the hinges are assembled, the outermost surface can be formed smoothly.

In the pair of protruding portions 123 surrounding the hinge portion 121, one protruding portion adjacent to the flexible display 140 and the other protruding portion adjacent to the elastic plate 150 may have different shapes. That is, when the modifiable section 120 is in a straight state as shown in FIG. 2B, the protruding portion 123b adjacent to the flexible display 140 may be in contact with the hinge portion 121 of another hinge, and the protruding portion 123a adjacent to the elastic plate 150 may be not in contact with the hinge portion 121 of another hinge. This makes it possible to restrict the direction of bending deformation to a direction toward the elastic plate 150.

If the shapes of the pair of protruding portions 123 are opposite to the above-described shapes, the direction of bending deformation may be restricted to a direction toward the flexible display 140.

Figure 3A:
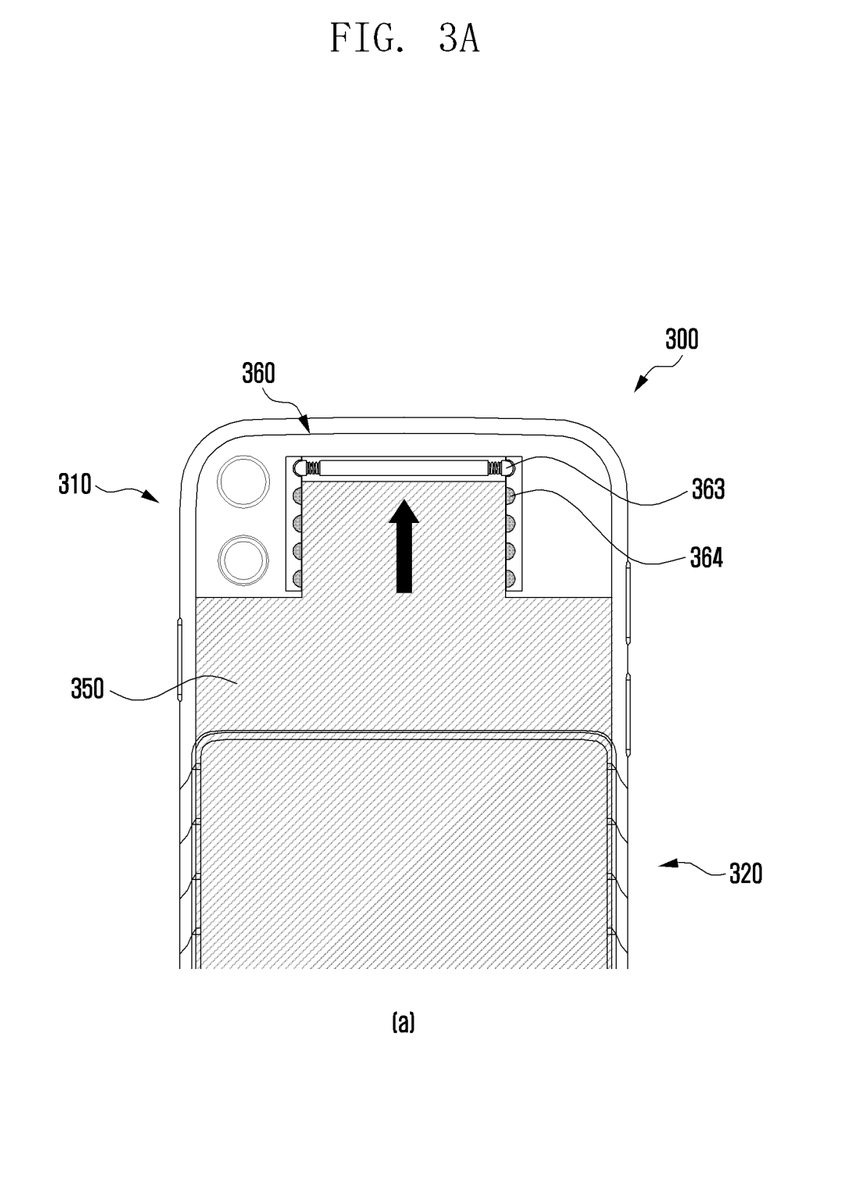
FIGS. 3A and 3B are diagrams illustrating a shape-fixing part of a shape-modifiable electronic device according to an embodiment of the disclosure.
Figure 3B:
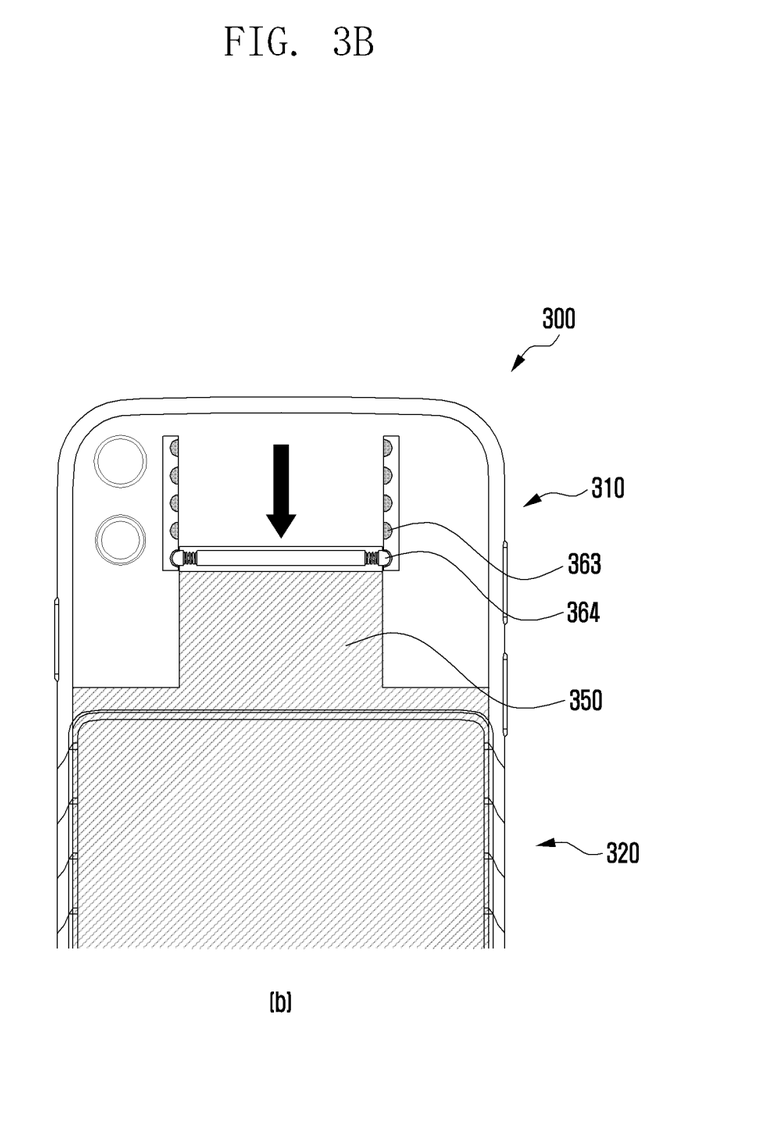

FIGS. 3A and 3B are diagrams illustrating a shape-fixing part 360 of a shape-modifiable electronic device 300 according to an embodiment of the disclosure. The embodiment of FIGS. 3A and 3B uses an elastically movable projection.

The shape-fixing part 360 may be configured to retain a bending deformation state or a straight state of a modifiable section 320. Specifically, the other end of an elastic plate 350 moves slidingly between a position in the straight state of the modifiable section 320 and a position in the bending deformation state of the modifiable section 320. The shape-fixing part 360 fixes the position of the other end of the elastic plate 350 that moved slidingly, thus retaining the deformed state of the modifiable section 320.

The elastic plate 350 may be formed to provide an elastic force such that the modifiable section 320 is bent in one direction and thereby deformed, or such that the modifiable section 320 is unfolded to the straight state.

The other end of the elastic plate 350 has an elastically movable projection 363 formed on both widthwise sides of the elastic plate 350. The elastically movable projection 363 protrudes outward from the elastic plate 350 by having an elastic body such as a spring, and may be retracted into the elastic plate 350 when an external force is applied.

In the first non-modifiable section 310 where the other end of the elastic plate 350 moves slidingly, a groove 364 is formed at a position corresponding to the position of the elastically movable projection. Because the elastically movable projection 363 is inserted into and held in the groove 364, the deformed state of the modifiable section 320 can be retained. In addition, a plurality of grooves 364 may be provided to adjust the degree of bending deformation of the modifiable section 320.

Figure 4A:
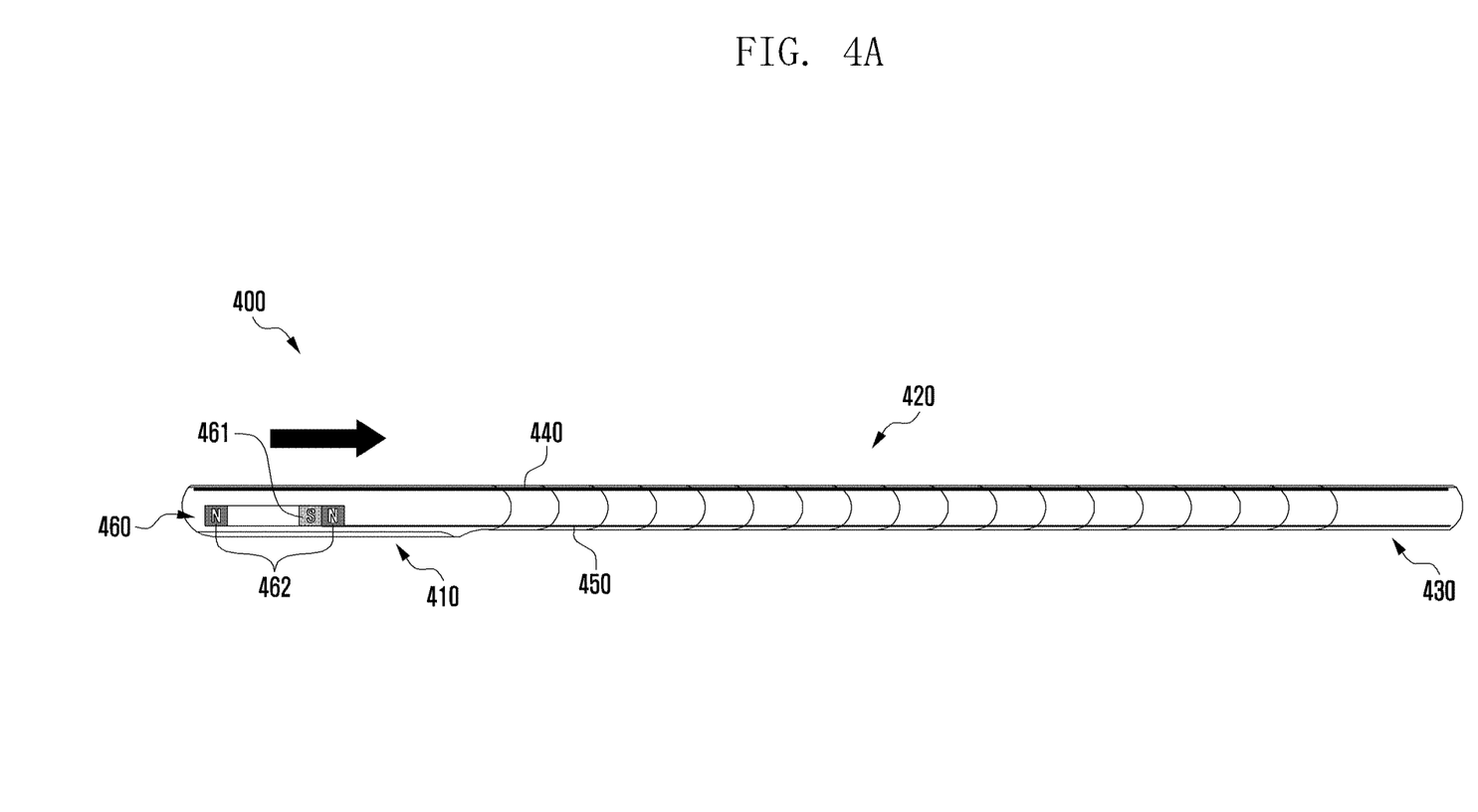
FIGS. 4A and 4B are diagrams illustrating a shape-fixing part of a shape-modifiable electronic device according to another embodiment of the disclosure.
Figure 4B:
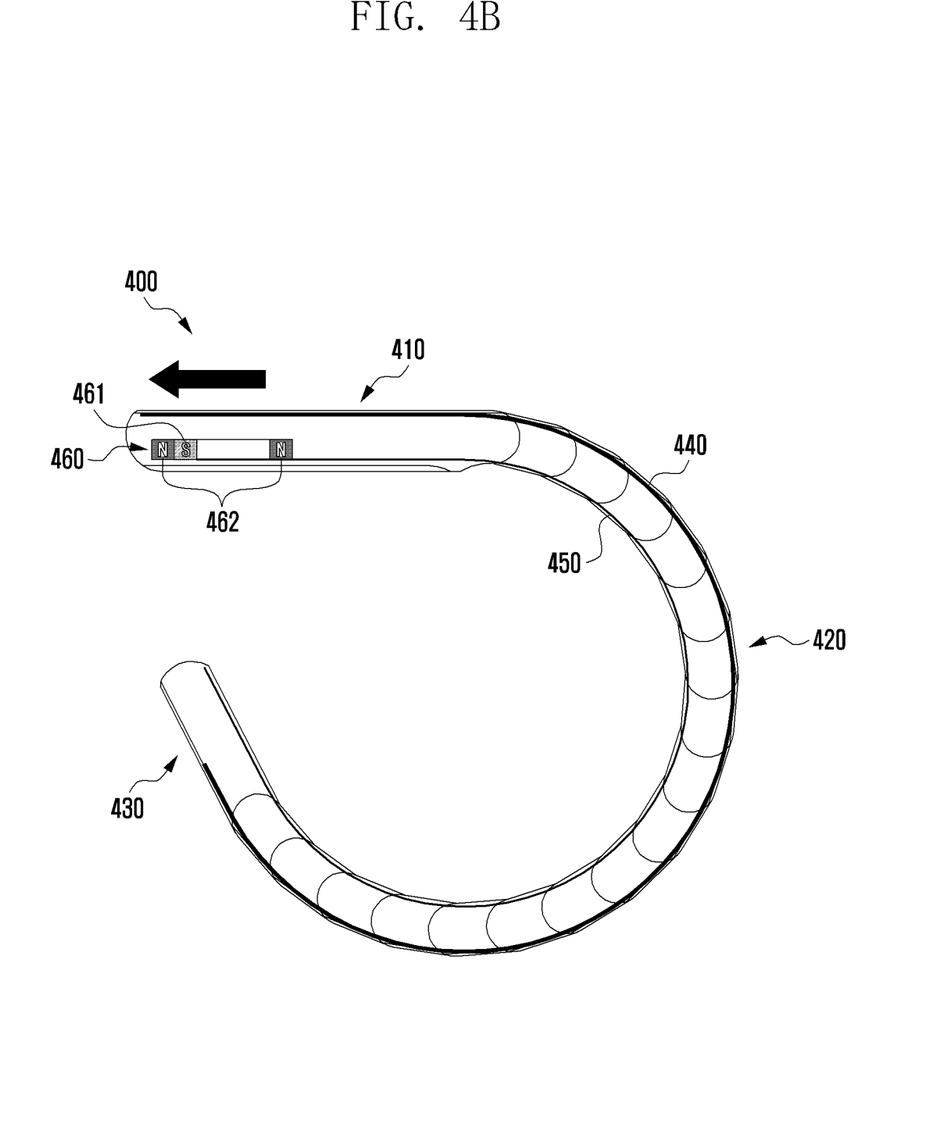

FIGS. 4A and 4B are diagrams illustrating a shape-fixing part 460 of a shape-modifiable electronic device 400 according to another embodiment of the disclosure. The embodiment of FIGS. 4A and 4B uses a magnet to retain the deformed state of the modifiable section 320.

In the embodiment of FIGS. 4A and 4B as in the embodiment of FIGS. 3A and 3B, the other end of an elastic plate 450 moves slidingly between a position in the straight state of a modifiable section 420 and a position in the bending deformation state of the modifiable section 420. The shape-fixing part fixes, by using a magnet, the position of the other end of the elastic plate 450 that moved slidingly.

For example, an S pole 461, which is a first pole of the magnet, is disposed at the other end of the elastic plate 450, and an N pole 462, which is a second pole of the magnet, is disposed in a first non-modifiable section 410 at both ends of a slide range of the other end of the elastic plate 450 so as to retain the deformed state of the modifiable section 420.

Figure 5A:
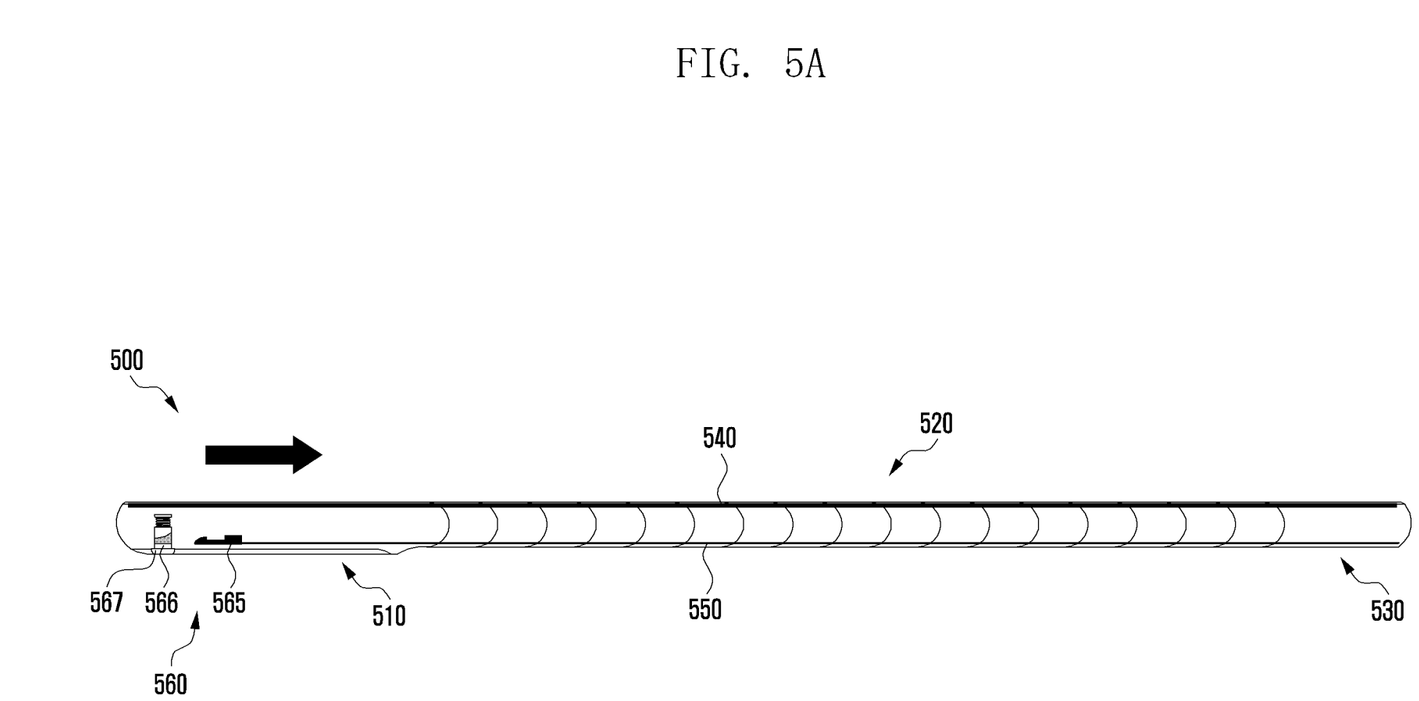
FIGS. 5A and 5B are diagrams illustrating a shape-fixing part of a shape-modifiable electronic device according to still another embodiment of the disclosure.
Figure 5B:
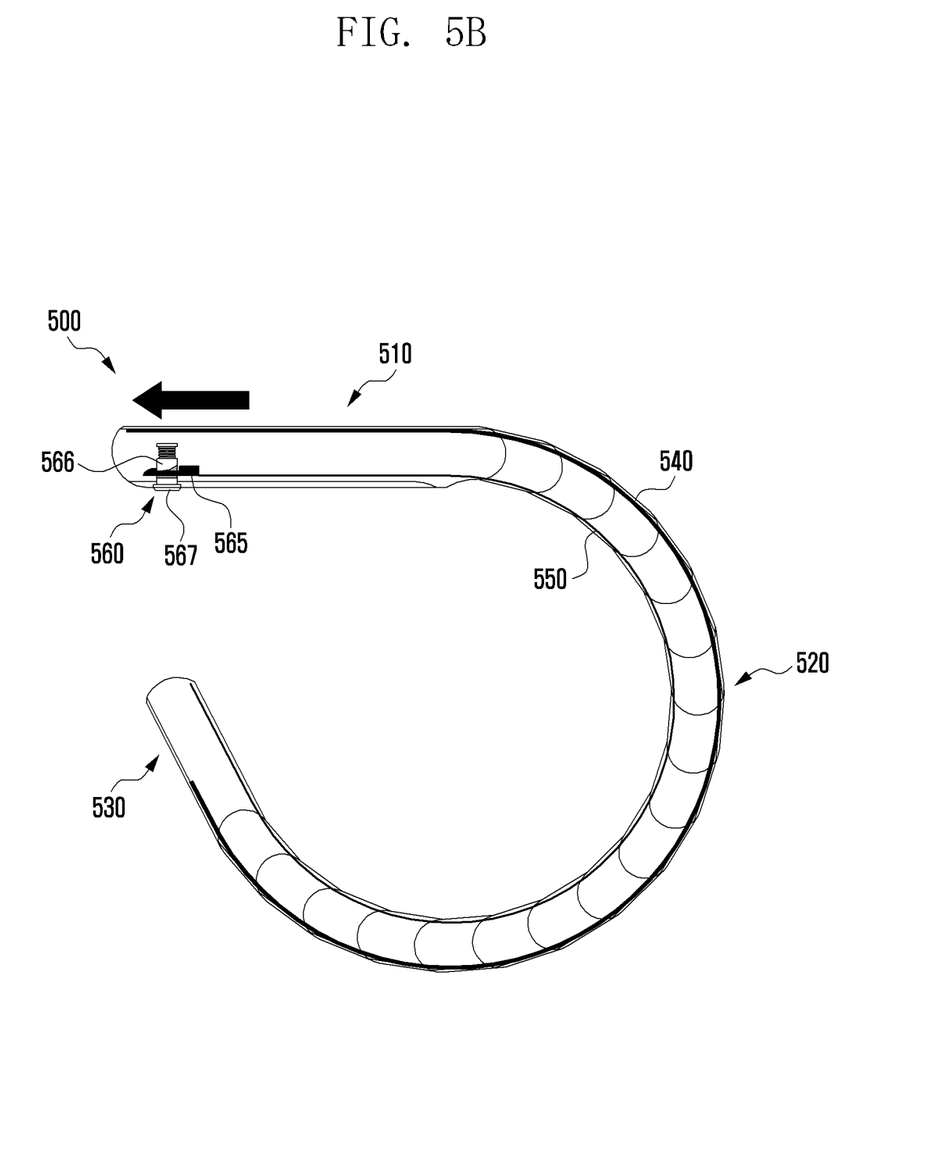

FIGS. 5A and 5B are diagrams illustrating a shape-fixing part 560 of a shape-modifiable electronic device 500 according to still another embodiment of the disclosure.

In the embodiment of FIGS. 5A and 5B as in the embodiment of FIGS. 3A and 3B, the other end of an elastic plate 550 moves slidingly between a position in the straight state of a modifiable section 520 and a position in the bending deformation state of the modifiable section 520. The shape-fixing part fixes, by using a hook 565 and a locking pin 566, the position of the other end of the elastic plate 550 that moved slidingly, thus retaining the deformed state of the modifiable section 520.

The elastic plate 550 may provide an elastic force such that the modifiable section 520 is unfolded to the straight state.

The modifiable section 520 may retain the straight state by the elastic force of the elastic plate 550. When the modifiable section 520 is bent and deformed by an external force applied to the electronic device, the hook 565 formed at the other end of the elastic plate 550 is engaged with the locking pin 566 formed in the first non-modifiable section 510. As a result, the deformed state of the modifiable section 520 may be retained. When the hook 565 is released through a button 567 formed in the modifiable section, the electronic device may return to the straight state again.

According to embodiments of the disclosure, an electronic device may include a first non-modifiable section which is one portion of an electronic device housing and has a fixed and retained shape; a modifiable section which is another portion of the electronic device housing, extends from the first non-modifiable section, and is capable of being bent and deformed in one direction; a second non-modifiable section which is still another portion of the electronic device housing, extends from the modifiable section, and is formed to be smaller than the first non-modifiable section; a flexible display disposed on one surface throughout the first non-modifiable section, the modifiable sensation, and the second non-modifiable section; an elastic plate disposed on other surface throughout the first non-modifiable section, the modifiable sensation, and the second non-modifiable section; and a shape-fixing part provided in the first non-modifiable section or the second non-modifiable section so as to retain a modified shape of the electronic device.

The flexible display may be formed to correspond to a total length of the first non-modifiable section, the modifiable section, and the second non-modifiable section when the modifiable section is in a straight state.

The elastic plate may be formed to correspond to a total length of the first non-modifiable section, the modifiable section, and the second non-modifiable section when the modifiable section is bent and thereby deformed.

Each of the flexible display and the elastic plate may be formed such that one end thereof is fixed to one of the first non-modifiable section or the second non-modifiable section, and other end thereof moves slidingly.

The one end of the flexible display and the one end of the elastic plate may be fixed to different non-modifiable sections.

The elastic plate may provide an elastic force such that the modifiable section is bent in one direction and thereby deformed.

The elastic plate may provide an elastic force such that the modifiable section retains a straight state.

The shape-fixing part may fix a position of other end of the elastic plate in a straight state of the modifiable section and the position of the other end of the elastic plate in a bending deformation state of the modifiable section.

In order to fix the position of the elastic plate, a first pole of a magnet may be disposed at the other end of the elastic plate, and a second pole of the magnet may be disposed in the first non-modifiable section.

The other end of the elastic plate may have an elastically movable projection formed on both widthwise sides of the elastic plate, the first non-modifiable section may have a groove formed to correspond to a position of the projection, and when the projection is inserted into and held in the groove, the position of the elastic plate may be fixed.

A plurality of the grooves may be provided between a position of the projection in the straight state of the modifiable section and a position of the projection in a maximum bending deformation state of the modifiable section so as to adjust a degree of bending deformation of the modifiable section.

The shape-fixing part may fix a position of other end of the elastic plate in a bending deformation state of the modifiable section.

A hook may be formed at the other end of the elastic plate, a locking pin may be formed in the first non-modifiable section, and when the modifiable section is bent and deformed, the hook may be engaged with the locking pin to fix a position of the elastic plate.

According to embodiments of the disclosure, a shape retaining structure of an electronic device that includes an electronic device housing composed of a first non-modifiable section, a modifiable section, and a second non-modifiable section and further includes a flexible display may include an elastic plate disposed on a surface opposite to a surface where the flexible display is disposed, throughout the first non-modifiable section, the modifiable sensation, and the second non-modifiable section; and a shape-fixing part provided in the first non-modifiable section or the second non-modifiable section so as to retain a modified shape of the electronic device.

The elastic plate may be formed to correspond to a total length of the first non-modifiable section, the modifiable section, and the second non-modifiable section when the modifiable section is bent and thereby deformed.

The shape-fixing part may fix a position of other end of the elastic plate in a straight state of the modifiable section and the position of the other end of the elastic plate in a bending deformation state of the modifiable section.

In order to fix the position of the elastic plate, a first pole of a magnet may be disposed at the other end of the elastic plate, and a second pole of the magnet may be disposed in the first non-modifiable section.

The other end of the elastic plate may have an elastically movable projection formed on both widthwise sides of the elastic plate, the first non-modifiable section may have a groove formed to correspond to a position of the projection, and when the projection is inserted into and held in the groove, the position of the elastic plate may be fixed.

A plurality of the grooves may be provided between a position of the projection in the straight state of the modifiable section and a position of the projection in a maximum bending deformation state of the modifiable section so as to adjust a degree of bending deformation of the modifiable section.

The shape-fixing part may fix a position of other end of the elastic plate in a bending deformation state of the modifiable section.

A hook may be formed at the other end of the elastic plate, a locking pin may be formed in the first non-modifiable section, and when the modifiable section is bent and deformed, the hook may be engaged with the locking pin to fix a position of the elastic plate.

The invention claimed is:

1. An electronic device comprising:
    a first non-modifiable section which is one portion of an electronic device housing and has a fixed and retained shape;
    a modifiable section which is another portion of the electronic device housing, extends from the first non-modifiable section, and is capable of being bent and deformed in one direction;
    a second non-modifiable section which is still another portion of the electronic device housing, extends from the modifiable section, and is formed to be smaller than the first non-modifiable section;
    a flexible display disposed on one surface throughout the first non-modifiable section, the modifiable section, and the second non-modifiable section, wherein one end of the flexible display is fixed to the first non-modifiable section;
    an elastic plate disposed on the other surface throughout the first non-modifiable section, the modifiable section, and the second non-modifiable section, wherein one end of the elastic plate is fixed to the second non-modifiable section and the other end of the elastic plate, disposed throughout the modifiable section and the first non-modifiable section, is configured to move slidingly; and
    a shape-fixing part provided in the first non-modifiable section and configured to fix a position of the other end of the elastic plate, that is configured to move slidingly, so as to retain a bending deformation state or a straight state of the modifiable section,
    wherein the other end of the flexible display, disposed throughout the modifiable section and the second non-modifiable section, is configured to move slidingly, and
    wherein the elastic plate is configured to provide an elastic restoring force to restore the modifiable section to a deformation state of being worn on a human body, when the shape-fixing part does not fix a position of the other end of the elastic plate.

2. The electronic device of claim 1, wherein the flexible display is formed to correspond to a total length of the first non-modifiable section, the modifiable section, and the second non-modifiable section when the modifiable section is in the straight state.

3. The electronic device of claim 1, wherein the elastic plate is formed to correspond to a total length of the first non-modifiable section, the modifiable section, and the second non-modifiable section when the modifiable section is bent and thereby deformed.

4. The electronic device of claim 3, wherein the shape-fixing part fixes a position of the other end of the elastic plate in the straight state of the modifiable section and the position of the other end of the elastic plate in the bending deformation state of the modifiable section.

5. The electronic device of claim 4, wherein, in order to fix the position of the elastic plate, a first pole of a magnet is disposed at the other end of the elastic plate, and a second pole of the magnet is disposed in the first non-modifiable section.

6. The electronic device of claim 4, wherein the other end of the elastic plate has an elastically movable projection formed on both widthwise sides of the elastic plate, and the first non-modifiable section has a groove formed to correspond to a position of the projection, and wherein, when the projection is inserted into and held in the groove, the position of the elastic plate is fixed.

7. The electronic device of claim 6, wherein a plurality of the grooves are provided between a position of the projection in the straight state of the modifiable section and a position of the projection in a maximum bending deformation state of the modifiable section so as to adjust a degree of bending deformation of the modifiable section.

8. The electronic device of claim 1, wherein the one end of the flexible display and the one end of the elastic plate are fixed to different non-modifiable sections.

9. The electronic device of claim 1, wherein the shape-fixing part fixes a position of the other end of the elastic plate in the bending deformation state of the modifiable section.

10. The electronic device of claim 9, wherein a hook is formed at the other end of the elastic plate, and a locking pin is formed in the first non-modifiable section, and wherein, when the modifiable section is bent and deformed, the hook is engaged with the locking pin to fix a position of the elastic plate.

* * * * *